(12) United States Patent
Meeker

(10) Patent No.: US 7,104,075 B2
(45) Date of Patent: Sep. 12, 2006

(54) ARRANGEMENT AND METHOD FOR CONTROLLING THE DISCHARGE OF CARBON DIOXIDE FOR AIR CONDITIONING SYSTEMS

(75) Inventor: Michael B. Meeker, Kenosha, WI (US)

(73) Assignee: Snap-On Incorporated, Kenosha, WI (US)

( * ) Notice: Subject to any disclaimer, the term of this patent is extended or adjusted under 35 U.S.C. 154(b) by 0 days.

(21) Appl. No.: 10/893,291

(22) Filed: Jul. 19, 2004

(65) Prior Publication Data
US 2006/0010889 A1    Jan. 19, 2006

(51) Int. Cl.
F25B 45/00    (2006.01)

(52) U.S. Cl. ............................. 62/77; 62/149

(58) Field of Classification Search .................... 62/77, 62/126, 217, 223, 228.3, 244, 324.6, 511, 62/50.4, 600, 298, 149, 224; 137/116.3
See application file for complete search history.

(56) References Cited

U.S. PATENT DOCUMENTS

| | | | |
|---|---|---|---|
| 3,580,006 A * | 5/1971 | Quick | 62/196.2 |
| 3,906,981 A * | 9/1975 | Jensen et al. | 137/115.26 |
| 4,997,459 A * | 3/1991 | Pelkey | 48/191 |
| 5,406,806 A | 4/1995 | Ricketts et al. | |
| 5,537,836 A | 7/1996 | Ricketts | |
| 5,557,940 A * | 9/1996 | Hendricks | 62/149 |
| 5,873,260 A * | 2/1999 | Linhardt et al. | 62/497 |
| 5,983,657 A * | 11/1999 | Murata et al. | 62/228.3 |
| 6,334,764 B1 * | 1/2002 | Kobayashi et al. | 418/55.5 |
| 6,428,295 B1 * | 8/2002 | Kobayashi et al. | 418/55.5 |
| 6,434,953 B1 * | 8/2002 | Bimboes et al. | 62/77 |
| 6,446,453 B1 * | 9/2002 | Trachtenberg | 62/292 |
| 6,481,977 B1 * | 11/2002 | Mameda et al. | 417/222.2 |
| 6,543,245 B1 * | 4/2003 | Waldschmidt et al. | 62/239 |
| 6,557,535 B1 * | 5/2003 | Stone | 123/527 |
| 6,585,192 B1 * | 7/2003 | Beers | 244/135 R |
| 2001/0025496 A1 | 10/2001 | Bimboes et al. | |

FOREIGN PATENT DOCUMENTS

DE    G 86 17 834.2    8/1988
JP    11-211325 A  *  8/1999

* cited by examiner

Primary Examiner—Mohammad M. Ali
(74) Attorney, Agent, or Firm—McDermott Will & Emery LLP

(57) ABSTRACT

A method and system for discharging refrigerant, such as carbon dioxide, from an air conditioning system. The discharge rate of the refrigerant from the air conditioning system is controlled by a discharge rate controller, even as refrigerant pressure at the system input varies. By maintaining discharge rate at a controlled value, the discharge time of the refrigerant from the air conditioning system is reduced.

25 Claims, 3 Drawing Sheets

ARRANGEMENT AND METHOD FOR CONTROLLING THE DISCHARGE OF CARBON DIOXIDE FOR AIR CONDITIONING SYSTEMS

TECHNICAL FIELD

The disclosed method and arrangements are related to the discharge of refrigerant, e.g., carbon dioxide, from air conditioning systems.

BACKGROUND

Recently, the refrigerant R744, i.e., carbon dioxide, has been employed in motor vehicle air conditioners instead of the conventional refrigerants R134a and R12. The use of carbon dioxide allows discharge of the refrigerant from the air conditioning system and venting to the atmosphere, unlike the conventional refrigerants. To protect system components from possible damage, it is usually recommended that the discharge rate be limited to some value. This value is typically expressed as a maximum pressure drop per minute such as 1 bar per minute.

Typically, discharge of carbon dioxide from an air conditioning system, such as used in an automobile, is accomplished by employing a fixed orifice that limits the flow rate of the discharging carbon dioxide. A block diagram of a conventional arrangement is depicted in FIG. 1, in which an air conditioning system 10 containing carbon dioxide to be discharged is connected to the fixed orifice 12. The carbon dioxide is discharged through the output 14 of the fixed orifice 12.

FIG. 2 shows an exemplary plot of the discharge rate (the Y-axis) vs. time (on the X-axis). It can be seen that the discharge rate decreases with time. The fixed orifice 12 prevents discharge rate from exceeding a safe maximum rate for the highest output pressure expected from the air conditioning system 10. However, one of the concerns for such a discharge arrangement is the relatively long time required to entirely discharge the air conditioning system 10. The long discharge time is a result of the refrigerant flow rate dropping due to reduced pressure differential across the fixed orifice 12. In other words, as carbon dioxide is discharged from the air conditioning system 10, output pressure from the air conditioning system 10 drops, causing input pressure at the fixed orifice 12 to drop and the pressure differential between the input of the fixed orifice 12 and the output of the fixed orifice 12 to be reduced. This reduces the discharge rate and increases the total discharge time, as depicted in FIG. 2. Even if the orifice were made adjustable to allow the discharge rate to be adjusted during a vehicle discharge, it would require an operator to be present to monitor and adjust the discharge rate.

There is a need for reducing the total discharge time for discharging carbon dioxide or other refrigerants from systems in a manner that still maintains integrity of the system and does not need to be tended to.

SUMMARY

The above stated need and others are met by embodiments, which provide a refrigerant discharge system for discharging refrigerant from an air conditioner. The system comprises a system input connectable to an air conditioner discharge port. A system output is provided at which refrigerant from the air conditioner is discharged. A discharge rate controller is connected between the system input and the system output. The discharge rate controller is configured to maintain a discharge rate of the refrigerant from the system output to a controlled value as refrigerant pressure at the system input varies.

By controlling the discharge rate of the system as the refrigerant pressure at the system input varies, the embodiments allow for a significant reduction in time required to discharge the system.

In other aspects, an arrangement is provided for discharging refrigerant from an air conditioner, this arrangement comprising a refrigerant input at which refrigerant is received from the air conditioner. A refrigerant output is provided at which the refrigerant is discharged from the arrangement. Means are provided for maintaining a substantially controlled discharge rate of the refrigerant from the refrigerant output as pressure of the refrigerant at the refrigerant input varies.

In still other aspects, a method is provided for discharging refrigerant from an air conditioning system. The method comprises opening a discharge outlet of the air conditioning system and maintaining a discharge rate of the refrigerant from the air conditioning system at a substantially contolled value as pressure of the refrigerant at the discharge outlet varies.

The foregoing and other features, aspects and advantages will become more apparent from the following detailed description when taken in conjunction with the accompanying drawings.

DETAILED DESCRIPTION

A method for discharging refrigerant from an air conditioning system and arrangements for achieving the same addresses certain problems related to the relatively long discharge time of prior arrangements. In particular, the embodiments address these concerns by maintaining the discharge rate of the refrigerant from the air conditioning system at a substantially controlled value as pressure of the refrigerant at the discharge outlet varies. In one embodiment, this discharge rate is held constant by use of a mechanical pressure regulator interposed between the air conditioning system and a fixed orifice. As the output pressure of the air conditioning system diminishes during the discharge process, the mechanical pressure regulator provides a constant pressure to the fixed orifice through most of the discharge process. In another embodiment, an electrically controllable valve is coupled to the output of the air conditioning system. The output pressure of the air conditioning system is monitored by a pressure transducer and the discharge rate controlled through the electronically controllable valve.

Figure 3:
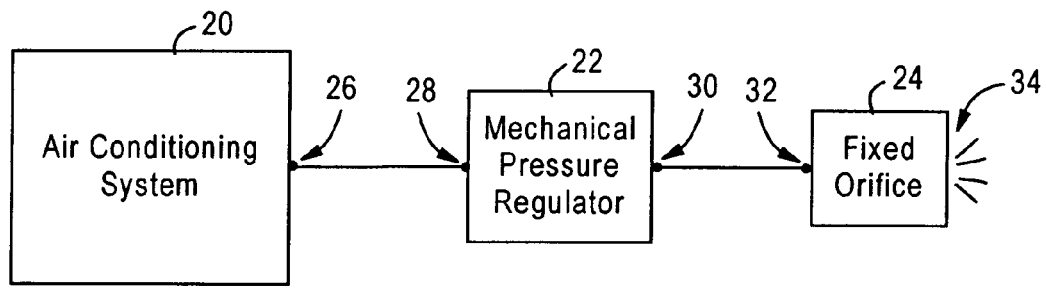
FIG. 3 is a block diagram of an arrangement for discharging refrigerant from an air conditioning system in accordance with certain embodiments.

FIG. 3 depicts an arrangement for discharging refrigerant from an air conditioning system. In the exemplary embodiments described, the refrigerant is carbon dioxide ($CO_2$) although the arrangement may be employed with systems containing some other refrigerants.

The arrangement of FIG. 3 is configured to discharge refrigerant from the air conditioning system 20 and maintain the discharge rate of the refrigerant from the system at a substantially constant value throughout most of the discharge process. For achieving this, the arrangement includes a mechanical pressure regulator 22 and a fixed orifice 24. The output 26, or discharge port, of the air conditioning system 20 is connected to the input 28 of the mechanical pressure regulator 24. The output 30 of the mechanical pressure regulator 24 is coupled to the input of the fixed orifice 24. The pressure regulator may be adjustable to allow the discharge rate to be adjusted. Refrigerant is discharged from the arrangement at the output 34 of the fixed orifice 24.

The mechanical pressure regulator 22 may be of conventional design. In practice, the mechanical pressure regulator 24 operates to maintain an output pressure at the output 30 of the mechanical pressure regulator 24, even as the input pressure at the input 28 of the mechanical regulator 24 varies. Hence, the input pressure at the fixed orifice 24 is maintained substantially constant even as the output pressure from the air conditioning system 20 changes during the discharge process. In other words, as the air conditioning system 20 is being discharged, the mechanical pressure regulator 22 maintains a constant value output pressure at the input 32 of the fixed orifice 24 for as long as possible.

Figure 1:
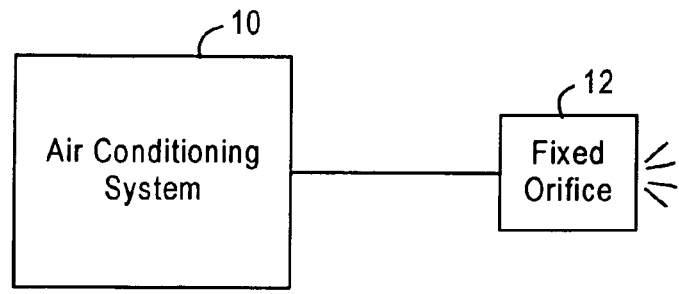
FIG. 1 is a block diagram of a conventional air conditioning system and discharge arrangement for discharging refrigerant from the air conditioning system.
Figure 2:
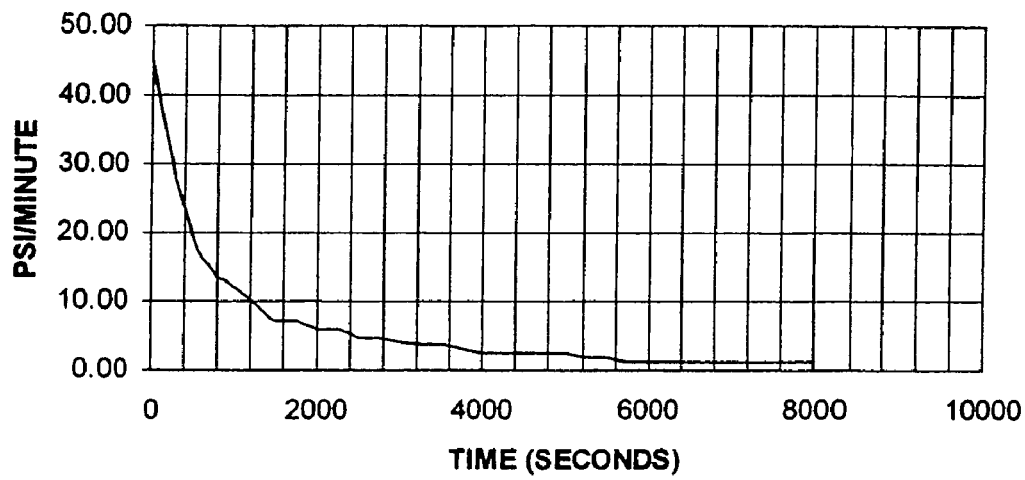
FIG. 2 is a graph depicting an exemplary relationship of discharge rate vs. time for the arrangement of FIG. 1.
Figure 4:
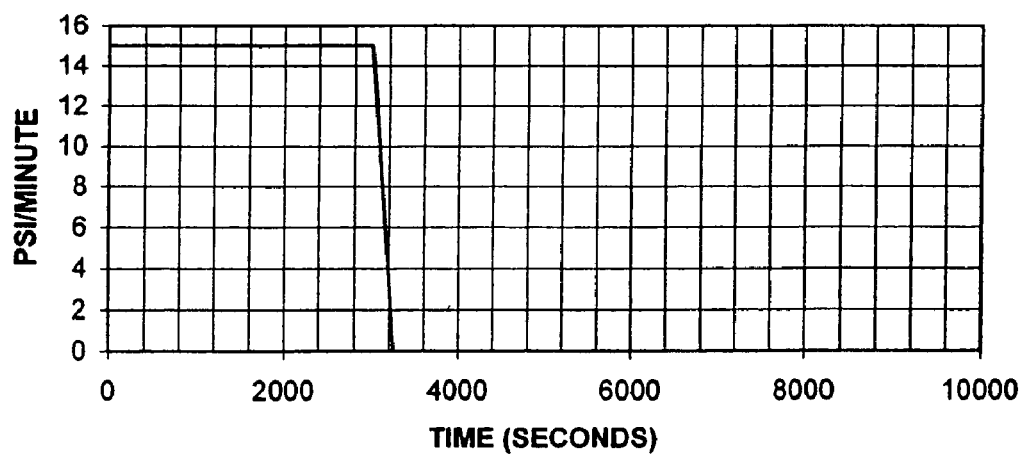
FIG. 4 is a graph depicting an exemplary relationship between the discharge rate vs. time for the arrangements of FIGS. 3 and 5.

FIG. 4 is an exemplary graph showing the discharge rate vs. time of the refrigerant being discharged in accordance with the pressure arrangement of FIG. 3 (and also FIG. 5, as will be described later). As can be appreciated from FIG. 3, the discharge rate is maintained at a substantially constant value for a longer period of time due to the presence of the mechanical pressure regulator 22. The discharge rate is more constant than in the conventional arrangement, the result of which is depicted in FIG. 4. Further, since the maximum flow rate is maintained for a longer period of time with the arrangement of FIG. 3, the discharge time is significantly reduced in comparison to the longer discharge time for the arrangement of FIG. 1, as seen in FIG. 2. This reduced discharge time is accomplished without exceeding the maximum safe flow rate.

Figure 5:
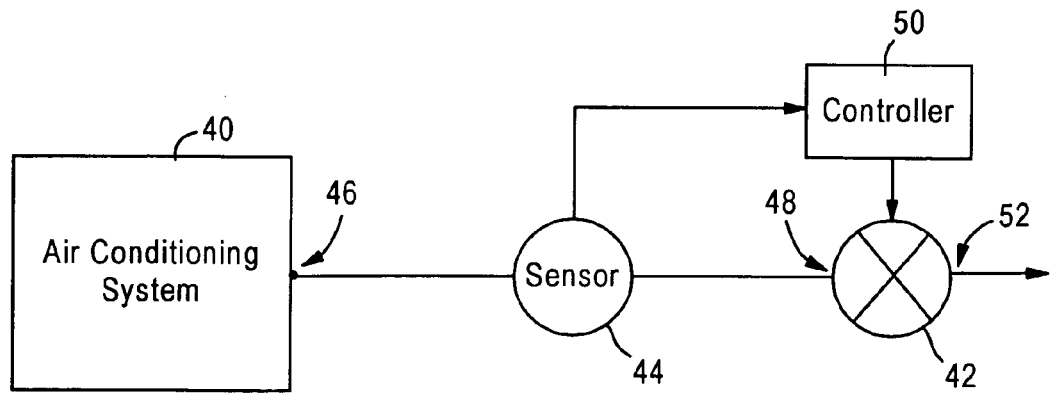
FIG. 5 depicts an arrangement for discharging refrigerants from an air conditioning system in accordance with other embodiments.

An alternative embodiment of an arrangement for discharging refrigerant from an ail conditioning system is depicted in FIG. 5. The air conditioning system with refrigerant to be discharged is designated by reference numeral 40 in FIG. 5. The air conditioning system 40 has an output 46 at which the refrigerant is discharged. The refrigerant discharge system of FIG. 5 includes an electrically controllable valve 42 whose input 48 is coupled to the output 46 of the air conditioning system 40.

A sensor 44, which may be a pressure transducer, for example, monitors the output pressure of the refrigerant being discharged from the air conditioning system 40. The sensor signal, indicating the output pressure from the air conditioning system 40, is fed forward as an input to a controller 50. Valve 42 is controlled by control signals from the controller 50. The output 52 of the electrically controllable valve 42 discharges the refrigerant from the refrigerant discharge system.

Figure 6:
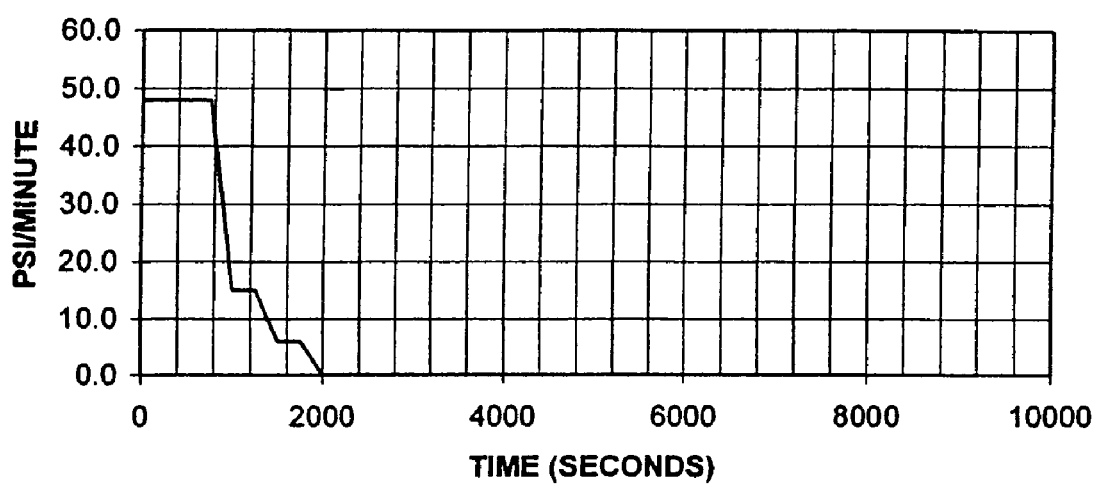
FIG. 6 is a graph depicting an exemplary relationship between the discharge rate vs. time for the arrangements of FIG. 5 with a multiple rate discharge.

Through the sensor 44 monitoring the refrigerant output pressure, and the actions of the controller 50 to control the valve 42, the discharge rate of the refrigerant being discharged is readily controlled. One of the advantages of the embodiment of FIG. 5 is the ease with which the flow rate can be changed to accommodate air conditioning systems having different specified maximum discharge rates. It can also be used to provide various discharge rates during a single vehicle discharge. An example of a multiple rate discharge is shown in FIG. 6

The arrangements of FIGS. 3 and 5 provide for discharging refrigerant, such as carbon dioxide, from air conditioning systems in a manner that reduces the refrigerant discharge time. It should be recognized that the apparatus finds particular utility in systems such as air conditioning systems for automobiles in which it is desired to discharge the refrigerant.

Although the above embodiments have been described and illustrated in detail, it is to be clearly understood that the same is by way of illustration and example only and is not to be taken by way of limitation, the scope being limited only by the terms of the appended claims.

What is claimed is:

1. A refrigerant discharge system for discharging refrigerant from an air conditioner, comprising:
   a system input connectable to an air conditioner discharge port;
   a system output at which refrigerant from the air conditioner is discharged; and
   a discharge flow rate controller connected between the system input and the system output and configured to control the discharge flow rate of the refrigerant from the system output at a substantially constant value as refrigerant pressure at the system input varies.

2. The system of claim 1, wherein the discharge flow rate controller comprises a pressure regulator with a pressure regulator input forming the system input, and having a pressure regulator output.

3. The system of claim 2, wherein the pressure regulator is configured to produce a refrigerant output pressure at the pressure regulator output that is substantially lower than the refrigerant pressure at the system input.

4. The system of claim 3, wherein the refrigerant output pressure at the pressure regulator output is less than one-half the refrigerant pressure at the system input.

5. The system of claim 4, wherein the discharge flow rate controller further comprises a fixed orifice having an input coupled to the pressure regulator output, and a fixed orifice outlet.

6. The system of claim 5, wherein the pressure regulator is a mechanical pressure regulator.

7. The system of claim 1, wherein the discharge flow rate controller comprises an electrically controllable valve coupled between the system input and the system output.

8. The system of claim 7, wherein the discharge flow rate controller further comprises a pressure monitor coupled to monitor the refrigerant pressure at the system input.

9. The system of claim 8, wherein the pressure monitor is coupled to the electrically controllable valve and generates a pressure signal that controls the electrically controllable valve as a function of the refrigerant pressure at the system input.

10. The system of claim 9, wherein the refrigerant is CO2.

11. The system of claim 6, wherein the refrigerant is CO2.

12. The system of claim 1, wherein the air conditioner is an automotive air conditioner.

13. The arrangement of claim 12, wherein the air conditioner is an automotive air conditioner.

14. An arrangement for discharging refrigerant from an air conditioner, the arrangement comprising:
   a refrigerant input at which refrigerant is received from the air conditioner;
   a refrigerant output at which the refrigerant is discharged from the arrangement; and
   means for maintaining a substantially controlled constant discharge flow rate of the refrigerant from the refrigerant output as pressure of the refrigerant at the refrigerant input varies.

15. The arrangement of claim 14, wherein the means for maintaining includes means for regulating output pressure of refrigerant at the refrigerant output as the pressure of the refrigerant at the refrigerant input varies.

16. The arrangement of claim 15, wherein the means for regulating output pressure includes a mechanical pressure regulator coupled between the refrigerant input and the refrigerant output.

17. The arrangement of claim 16, wherein the means for regulating output pressure includes a fixed orifice coupled between the mechanical pressure regulator and the refrigerant output.

18. The arrangement of claim 17, wherein the refrigerant is $CO_2$.

19. The arrangement of claim 15, wherein the means for regulating output pressure includes an electrically controllable valve coupled between the refrigerant input and the refrigerant output.

20. The arrangement of claim 19, wherein the means for regulating output pressure includes means for monitoring the pressure of the refrigerant at the refrigerant input and control the electronically controllable valve in response thereto so as to maintain a substantially controlled constant discharge flow rate of the refrigerant from the refrigerant output.

21. The arrangement of claim 19, wherein the refrigerant is $CO_2$.

22. A method of discharging refrigerant from an air conditioning system, comprising the steps of:
   opening a discharge outlet of the air conditioning system; and
   maintaining a discharge flow rate of the refrigerant from the air conditioning system at a substantially controlled constant value as pressure of the refrigerant at the discharge outlet varies.

23. The method of claim 22, wherein the refrigerant is $CO_2$.

24. The method of claim 23, wherein the step of maintaining a discharge flow rate includes regulating output pressure of the refrigerant.

25. The method of claim 22, wherein the air conditioner is an automotive air conditioner.

* * * * *